(12) United States Patent
Botti

(10) Patent No.: US 10,731,696 B2
(45) Date of Patent: *Aug. 4, 2020

(54) FIRE FIGHTER'S PERSONAL ESCAPE SYSTEM

(71) Applicant: Charles Christopher Botti, Denville, NJ (US)

(72) Inventor: Charles Christopher Botti, Denville, NJ (US)

(*) Notice: Subject to any disclaimer, the term of this patent is extended or adjusted under 35 U.S.C. 154(b) by 150 days.

This patent is subject to a terminal disclaimer.

(21) Appl. No.: 15/276,081

(22) Filed: Sep. 26, 2016

(65) Prior Publication Data

US 2017/0072229 A1 Mar. 16, 2017

Related U.S. Application Data

(60) Continuation of application No. 13/066,654, filed on Apr. 20, 2011, now Pat. No. 9,494,183, which is a division of application No. 11/407,826, filed on Apr. 20, 2006, now Pat. No. 7,942,241.

(51) Int. Cl.
*F16B 45/02* (2006.01)
*A62B 1/16* (2006.01)
*A62B 35/00* (2006.01)

(52) U.S. Cl.
CPC ............ *F16B 45/02* (2013.01); *A62B 1/16* (2013.01); *A62B 35/0037* (2013.01); *Y10S 24/34* (2013.01); *Y10T 24/4512* (2015.01); *Y10T 24/45435* (2015.01); *Y10T 24/4755* (2015.01)

(58) Field of Classification Search
CPC ....... F16B 45/02; Y10S 24/34; Y10T 24/4512
See application file for complete search history.

(56) References Cited

U.S. PATENT DOCUMENTS

| 190,829 | A | 5/1877 | Constantino | 224/667 |
| 279,744 | A | 6/1883 | Greene | 182/192 |
| 287,492 | A | 10/1883 | Woodward | 182/3 |
| 939,375 | A | 11/1909 | Andrews | 182/232 |
| 1,300,870 | A | 4/1919 | Plush | 182/70 |
| 2,357,478 | A | 9/1944 | Koch | 24/600.9 |

(Continued)

FOREIGN PATENT DOCUMENTS

FR 2847481 A1 * 5/2004 ............. A63B 27/02

*Primary Examiner* — Colleen M Chavchavadze
(74) *Attorney, Agent, or Firm* — Ernest D. Buff & Associates, LLC; Ernest D. Buff; Margaret A. LaCroix

(57) ABSTRACT

A wearable lightweight fire fighter's personal escape system and method includes a rope, having a distal and proximal end, organized in parallel segments disposed in an inner pouch. The inner pouch is entirely contained in an outer pouch that is appointed to be removably attached to a belt or harness, worn by a fire fighter. The proximal end of the rope exits through an opening in the inner pouch and outer pouch and is attached directly to a lightweight hook, or optionally enters a belay device. The hook has a sharp point for creating a purchase point on soft surfaces, a hook opening having sufficient diameter to surround radiators, steam pipe and the like, and capture rope that surrounds substantial objects. The hook has a central opening appointed for holding a firefighting tool to aid in creating a substantial object. The fire fighter escapes by creating a purchase point and repelling at a high speed or at a controlled speed by adjusting belay friction.

15 Claims, 9 Drawing Sheets

(56) References Cited

U.S. PATENT DOCUMENTS

| | | | |
|---|---|---|---|
| D175,302 S * | 8/1955 | Gale | F16B 45/02 D8/367 |
| 2,729,425 A | 1/1956 | Gschwind | 182/239 |
| 3,419,236 A | 12/1968 | Weber | 244/151 R |
| 3,676,882 A | 7/1972 | Lindqvist | 441/85 |
| 3,738,449 A | 6/1973 | Arancio | 182/7 |
| 3,814,210 A | 6/1974 | Hoffman | 182/6 |
| 4,102,431 A | 7/1978 | Carroll et al. | 182/5 |
| D271,466 S | 11/1983 | Bissonnet | D8/367 |
| 4,688,674 A | 8/1987 | Stirtz | 206/388 |
| 4,714,135 A | 12/1987 | Bell et al. | 182/6 |
| 4,768,619 A | 9/1988 | Darnell | 182/129 |
| 5,090,503 A | 2/1992 | Bell | 182/5 |
| 5,107,956 A | 4/1992 | Constantinis et al. | 182/5 |
| 5,360,083 A | 11/1994 | Hede | 182/5 |
| 5,868,219 A | 2/1999 | Sadeck et al. | 182/70 |
| 5,940,943 A * | 8/1999 | Kloster | F16B 45/02 24/583.11 |
| 5,970,517 A | 10/1999 | Jordan | 2/69 |
| 6,516,920 B1 | 2/2003 | Schafler | 182/70 |
| 6,800,007 B2 | 10/2004 | Calkin | 441/84 |
| 6,880,702 B1 | 4/2005 | Colorado | 206/388 |
| 7,131,515 B2 | 11/2006 | Gartsbeyn et al. | 182/192 |
| 7,233,240 B2 | 6/2007 | Phillips | 340/539.13 |
| 2003/0183449 A1 | 10/2003 | Martin | 182/8 |
| 2003/0205430 A1 | 11/2003 | Na | 182/72 |

* cited by examiner

FIRE FIGHTER'S PERSONAL ESCAPE SYSTEM

CROSS-REFERENCE TO RELATED APPLICATIONS

This application is a continuation of applicant's copending U.S. patent application Ser. No. 13/066,654, filed Apr. 20, 2011 which, in turn, is a division of applicant's U.S. patent application Ser. No. 11/407,826, filed Apr. 20, 2006, for "Fire Fighter's Personal Escape System", now U.S. Pat. No. 7,942,241, the disclosures of which are hereby incorporated in their entirety by reference thereto.

BACKGROUND OF THE INVENTION

1. Field of the Invention

The present invention relates to a lightweight wearable personal escape system and a method therefor for providing escape capability for fire fighters from high-rise buildings; and more particularly, to a personal escape system that provides a lightweight hook appointed to engage with a substantial object and being attached to a high strength heat resistant rope organized into a plurality of segments disposed in a discrete substantially parallel relationship with each other to provide for reliable tangle free high speed deployment so that a fire fighter can escape a perilous situation with rapid descent.

2. Description of the Prior Art

Many patents address issues related to escaping from elevated locations including high-rise buildings. Some of these patents relate to fixed anchoring systems which an escaping person must attach himself to propel therefrom. Others disclose wearable systems that are bulky, heavy and unwieldy and therefore prevent a fireman from accomplishing his or her work.

U.S. Pat. No. 190,829 to Costantino discloses a fireman's belt, which carries a coiled knotted rope. The fireman's belt includes a fireman's escape attachment and a fireman's tool carrier, generally comprising a belt, coil of rope having knots at intervals, and a spike. The presence of the knots in the rope prevents its free delivery. The fireman has to hold the rope by his hand and rest his legs over the knots to climb down, which cannot be accomplished easily by a fireman wearing shoes or boots.

U.S. Pat. No. 279,744 to Greene discloses a fire escape. The fire escape has a frame or box, to which a waist-strap or sling is attached for connection with the body of a person escaping a fire. A roller is mounted on the side of the frame, secured to a wheel with a peripheral flange on the inner face of which a brake shoe is attached. A friction band encircles the wheel. When a person descends, the weight of the person applies pressure on the rope forcing the brake against the wheel preventing rapid descent of the frame and the person attached thereto. If the descent is perceived to be too rapid, a lever may be operated to force the friction band against the wheel, further decreasing the rate of descent. The disclosed fire escape apparatus is a bulky device with more than one braking mechanism to decrease the rate of descent of a person escaping a fire. This fire escape apparatus is not a fireman's emergency exit tool since the braking action is not reliably controlled due to the use of two independent braking systems. The hook is not designed to create a purchase point on commonly available sources. The rope is not contained within the device, rather goes through the friction generating mechanisms.

U.S. Pat. No. 287,491 to Woodward discloses a fire escape system. The fire escape system uses a rope with a hook appointed for attaching the rope to a suitable location. The rope passes between and is clamped by two wooden arms. The inner surfaces of the arms have a groove near the hinge through which the rope slides. A sliding sleeve is provided in the rope where the person who is escaping fire grabs the rope and the friction generated at the arms decreases the rate of descent of the person. The arms are attached to a belt, which encircles the user. The rope has to be hung from a suitable place and is not provided with a hook adapted for securement to an object through penetration via a purchase point. The sleeve only prevents the rope burn of a descending person and the wooden arms provide the friction to slow descent in a smooth rope. The friction generated is not controlled and therefore this device does not allow quick exit from a fire situation and is not useful for a fire fighter. There is no support for the escaping person since there is no support at the end of the rope. As a consequence, the person attempting to escape may receive a severe fall.

U.S. Pat. No. 939,375 to Andrews discloses a fire escape. The portable fire escape comprises a casing containing a reel on which a line or cable is wound. The casing is supported on any suitable place on a building from which the fire escape is to be made. The casing carries a sling to support a person and is lowered by paying out a line or cable from the reel. The speed of descent is controlled by any suitable mechanism. After descent, the casing is returned back to its original location by a spring contained in the device and is available for use by another person. In this disclosure, the fire escape is attached to a specific location in a building and a person has to get to the device for descent. The escaping person does not carry the fire escape device. The pay out of the line is resisted by a spring mechanism and the escape is therefore slow.

U.S. Pat. No. 1,300,870 to Plush discloses a receptacle for fire escapes. The receptacle provides a container for housing and coiling a fire escape rope, thereby concealing the rope when it is not in use and protecting the rope from rodents. The device is attached to a wall or a building and is not carried by a person escaping fire or a fire fighter. Moreover, the disclosed receptacle does not provide quick exit of a fire fighter from a fire emergency situation since no escape tool is carried by the fire fighter.

U.S. Pat. No. 2,729,425 to Gschwind discloses a safety device. The safety device is worn on the back of the user who works above ground level. A housing with a front plate and back plate is attached to a safety harness. A safety rope is coiled within the device and is attached to a hook anchored in a building. During use, the rope is attached to a fixed location on the wall or window hook to provide support to a user who is working off ground. The pulley carrying the rope has a V shaped channel on one side through which a belt passes. The ends of the V belt are fastened to two blocks connected to a braking lever. This braking action prevents the pay out of the rope at a high speed providing support for the user, who can only move at a low velocity. The safety device supports the user in a fall situation. This safety device is not an escape mechanism for a fire fighter but allows above ground workers gradual movement. It does not provide quick escape of a fire fighter from a fire situation due to the presence of braking action, which restricts fast movement. The hook and rope are not carried by the person wearing the bulky device.

U.S. Pat. No. 3,419,236 to Weber discloses a personnel lowering device intended for lowering parachuters marooned in high trees, and being provided as a lightweight attachment to a standard parachute. The device has a rescue lowering line which is passed through parachute risers. The device has an emergency braking and a stowage pack. The male fittings are provided for parachute canopy release. The line is equipped with a snap hook on its free end. This personnel lowering device is attached to a parachute and allows a user to lower from a high tree. The device uses a brake to prevent rapid descent of the user. This is not a fireman's escape. It does not allow quick exit of a fireman from an unsafe situation since the device incorporates a brake, which cannot be disengaged. Moreover, the device is an integral part of the parachute not carried by the person using the parachute.

U.S. Pat. No. 3,676,882 to Lindqvist discloses life saving implements. The implements include a line securely fastened to the bottom of a narrow elongated bag, which is open at one end. The bag is buoyant and contains a weight so that it floats. When the bag is thrown to a person requiring assistance in water, the thrower holds a free end of the line and in turn a length of line contained in the bag is free to run from the bag as the bag travels to the victim. The disclosed implements provide a buoyant device for use in water that is thrown to a person requiring assistance. As the bag is traveling in air to the victim, the line contained in the bag is released. The life saving implement, a buoy, is not carried by the person needing assistance, rather, it is thrown to the escaping person in water by the rescuer. The life saving implements do not provide an escape means for a fireman.

U.S. Pat. No. 3,738,449 to Arancio discloses a safety descent apparatus. A harness is detachably supported inside a coat and fastened loosely around the wearer's waist and buttocks, so that the wearer can move around when the apparatus is not in use for descent. A hook at one end of a rope is anchored around a substantial object. The harness has an additional hook to attach to a ladder and other objects for safety. The loose end of the rope is then thrown out of a window. The user wraps the rope three or four times around a hook on the harness and lets himself out of the window and is supported by the anchored rope. To stop descent, the rope is pulled and to descend the rope is fed up. The rope is not carried by the person using the device. The rope does not have a hook capable of multiple anchoring functionality. The descent rate is merely controlled by the number of times the rope is wrapped around the hook and one of the turns may slip out suddenly decreasing friction providing unreliable descent.

U.S. Pat. No. 4,102,431 to Carroll et al. discloses emergency personnel lowering apparatus appointed for use by aircrew men. The emergency personnel lowering apparatus comprises a support frame and has a stowage bag that includes a lowering line stowed in a plurality of hanks within the bag. A lowering control mechanism and an attachment line are positioned within the bag adjacent the lowering line. A portion of the attachment line extends out of the bag and forms a pull loop. The lowering control mechanism includes an adjustable descent control mechanism which controls the area of contact between different portions of the lowering line to control the rate of descent. Plural paths are provided for the lowering line in the descent control mechanism to adapt the system for different loads. A brake mechanism is provided to stop descent if the person on the line becomes incapable of self-protection on the ground. This disclosed device is for rescuing downed aircrew men from marooned positions in high trees. The lowering line is secured to firm support looping the toggle in the lowering line and the person to be lowered is attached to the support. The brake in the lowering line decreases the rate of descent. This is a bulky device and is not worn by a fire fighter for escape from emergency situation. There is no hook present in the device for multiple attachments to substantial objects.

U.S. Pat. No. 4,688,674 to Stirtz discloses a sack and rope assembly. A continuous length of line is stored in a sack of mesh construction and a line is stored within the sack formed as multiple collections of line following one another and serially located in the interior of the sack. The sack has a closable throat at one end through which controlled portions of the line are paid out in an orderly fashion and without snarling and knotting of the line when needed. The line and sack assembly has a multiplicity of uses. For instance, such may be used in the storing of a length of rope in a car, boat, or other vehicle with the rope in readiness for use in emergencies, or for other uses (such as a tow rope for water-skiing, or as an anchor rope for a boat). One extremity of the line appears at one end of the sack, and the other extremity of the line appears at the other end of the sack. Provision is made through the presence of an enlarged closeable opening at one end of the sack to reload the sack with serially located accumulations or collections, after use of the rope and for storage purposes. With the sack reloaded, the line is maintained in an ordered manner, whether the sack be moved from place to place, be stepped upon, or bent on itself for storage purposes. The rope in this device is organized within a mesh sack in compartments and the rope sticks out of the bag on both sides. Gripping the sack by hand provides friction for the rope. The rope is not integrally associated with a hook and cannot be readily used by a fireman for escape from a burning inferno.

U.S. Pat. No. 4,714,135 to Bell et al. discloses a rappel rescue system. This compact, rapidly deployable rappel rescue system is housed in a lightweight carrier and connected to a belt or harness for portable use or mounted in a stationary position readily available for emergency use. The carrier contains a carabineer connected to one end of a tubularly woven Kevlar aramid fiber of similar lightweight, high strength synthetic polymer rappel line folded into a deployment bag, an edge guard protective sleeve pad slidable on the line and adjustable to the rappel point, a modified figure-of-eight multi-configuration descender, and an end-stop ring connected to the other end of the rappel line. The deployment bag allows the entire line to be removed from the carrier and simply dropped, as the deployment bag falls to the ground the rappel line will automatically deploy ready for use. Alternatively, the line may also be deployed from the carrier while rappelling. This system comprises a carrier within which a ripcord is placed in a deployment bag. The carabineer is used to form a loop in the repel line and the loop is slipped over a pipe or a support object. The deployment bag with the repel line carrying an eight-shaped descender is thrown to the ground and the free end of the repel line hangs freely. The stop ring prevents descent beyond the end of the repel line. The repel rescue system does not have a hook for creating attachment point readily. The rope is maintained in the deployment bag in an unorganized manner and can snag or tangle easily. The attachment of the carrier to a belt or harness is by means of Velcro strips, and is likely to separate under the weight of the person using the device.

U.S. Pat. No. 4,768,619 to Darnell discloses a fire escape device. This fire escape device is adapted for use in escaping from a structure through the screen of a screened-in area. The device comprises an elongate non-combustible core of fire-resistant wire escape rope, a dull screen-cutting knife, and a connector securing the knife to the rope adjacent one end of the rope. The escape means has a first end adapted to be secured to the structure and a second end adapted to be moved through a cut screen, the second end being the one secured to the cutting means. The device has an attachment hook attached to a rope with knots and a dull screen-cutting knife attached to the distal end of the rope. The user cuts the screen, attaches the hook to tie around a support, such as furniture, and begins the descent using the knots in the rope. The fire escape does not have a multi-attachment hook and solely relies on the attachment of a loop formed using the hook to support the person during descent. The knots in the rope prevent quick descent. The fire escape device is unsuited for use by a fire fighter.

U.S. Pat. No. 5,107,956 to Constantinis et al. discloses a descending device whereby personnel or other loads may descend from an elevated position at a controlled and variable speed. The descending device comprises a restraining member having a series of slots. A tape or rope stored in a container, which passes through in alternate directions passes through the slots, one or more edges of each aperture defining a contact surface providing frictional engagement for the line as the load descends. A hook is provided for attachment of the device to a fixed point. The restraining member incorporates a large aperture, which may serve as a handgrip. There is also included a harness to be worn by the user, which is adapted to be attached to the restraining member and to the container by one or more quick release shackles. The harness may be of a so-called "nappy" type or may consist of a waistband and crotch straps with means for attachment of the restraining member to at least one loop at the front of the waistband, whilst the container is attached to the side region of the harness. Still further, the entire harness may be incorporated into a survival suit which may have provision for the container to be attached to the suit about the wearers knee or any other accessible position. The user wearing a harness that is removably attached to the restraining member may descend at a controlled rate determined by a light load applied to the tape below the restraining member owing to the frictional contact of the tape passing around the edges of slots. After the descent a quick release shackle releases the harness from the device. The descending device does not have a multi-functional hook capable of creating an anchoring point. The tape or rope is carried in a separate canister, not by the descending person. Moreover, the person needs to use the 'nappy' harness and is not directly attached to a belt or body harness.

U.S. Pat. No. 5,868,219 to Sadeck et al. discloses a rappel rope storage and deployment system. The bag containing the rappel rope is provided with three openings. The first opening passes the knotted first end of the rope preventing its entry back into the bag. The second opening accesses the middle of the rope providing two strands of the rappel rope. The third opening accesses the second free end of the rope. The bag is attached to the belt of the person descending and he may use the single rope from the third opening or the double strand from the second opening. The rope needs to be attached to a support point and no multi-functional hook is provided. Unlike the first end of the rope which has a knot, the second end of the rope may slide back into the bag during descent presenting an unsafe situation since a double strand of the rappel rope is no longer available.

U.S. Pat. No. 5,970,517 to Jordan discloses a safety harness assembly with an integral support line. The safety harness assembly includes a hollow interior harness body, which receives the support line. The support line has first and second ends that extend from the harness body. The harness is secured within a garment. The garment has a front opening, which is normally covered by a releasable flap. The first and second ends of the support line extend through the front opening and are accessible when the flap is moved to an open position. The first end of the support line may be pulled away from the harness to extend the support line therefrom. The second end of the support line is secured to the harness. This safety harness wraps around the torso of the wearer with shoulder straps. An inner pouch within the harness carries the integrated support line. The first and second end of the support line are connected to a carabineer and the first end is free to be extended, releasing 50 feet of support line, while the carabineer attached to the second end is firmly connected to the safety harness. The user connects the first end carabineer to a support structure. This safety harness has no hook to create an attachment support point. Only a carabineer is provided. The rope is not orderly packed within the safety harness and may snag or tangle easily. There is no friction device limiting the descent speed of the user. Since the safety harness is supported on the torso and shoulder straps, it is unsuitable for lowering a person from a height since the safety harness may slip over the head.

U.S. Pat. No. 6,516,920 to Schafler discloses a tag line pack. This tag line pack has applications as a safety device for firefighters or rescue personnel and includes a container or bag having a pack of safety line formed from flat fabric webbing folded into a plurality of accordion folds or laps and deployed from a lower end of the bag. The bag may be hand carried, or may be secured to the body of the firefighter. The tag line pack contains a bag, which contains safety line of accordion folded fabric with one end attached to the bag and the other free end carrying a metal block and a loop. The metal block secures the free end to a hinged doorframe and the loop end attaches to a pole. The hand carried tag line has no attachment to the body and the fire fighter has no means to attach himself to the tag line bag. In the version of the tag line pack that is attached to the fire fighter, there is no mechanism provided to limit the descent rate of the fire fighter. The tag line pack does not have a multi-attachment hook.

U.S. Pat. No. 6,800,007 to Calkin discloses a wearable personal emergency rescue apparatus. This wearable personal emergency rescue apparatus comprises a wearable flexible bag member with randomly laid cord used for rescue. One end of the cord is attached to the bag member and the other end is attached to a carabineer. The bag is made from buoyant material so that it can be used for water safety. The user throws the bag to the person being rescued and once the person being rescued wears the wearable bag, he/she is drawn to safety by pulling on the cord. The rescue apparatus is not worn by the person being rescued, but rather is thrown to the person being rescued. There is no multi-attachment hook present in the free end of the cord. This device is not a personal safety system for a fire fighter.

U.S. Pat. No. 6,880,702 to Colorado discloses a firefighter's rope bag and rapid deployment system. The rope bag is left outside the building where the fire fighter has to enter and the rope is deployed from the bag defining the entry and exit path for the fire fighter when the pathway visibility is obstructed by smoke. This device does not provide rescue for a fire fighter from a height.

U.S. Patent Application No. 2003/0205430 to Na discloses a fire escape device. The device consists of a hollow backboard attached to a harness, which has a waist strap and bottom strap. The hollow backboard has a woven rope fabric that is attached on the bottom to a secure rod and the rope at the upper end of the woven fabric is pulled to continuously unravel the rope. The upper end of the rope is attached to a hook connected to a supporting structure. The rope of the woven rope fabric is coated with paraffin to prevent snagging of the rope. The rope passes through three resistant rods, which are compressed against each other by compression springs. The tension of the compression pin is increased by a handle to increase the friction of the rope thereby reducing the rate of descent of the user. The fire escape device does not have a multi-attachment hook for providing easily accessible support locations. The rope is released by unraveling a woven rope fabric. Moreover, the pay out of the rope is jerky and the descent of the user is unpredictable in spite of the friction generation rods.

There remains a need in the art for a light weight system that is wearable by a fire fighter and has an attachment hook that can establish a purchase point in readily available locations and reliably permits the escape of a fire fighter from elevated locations in high rise buildings that present danger to the fire fighter's life.

SUMMARY OF THE INVENTION

The present invention discloses a lightweight wearable fire fighter's escape system which allows reliable and rapid escape of a fire fighter from elevated locations in high-rise buildings. This system facilitates a fifty (50) foot escape distance. A fire fighter wearing the subject escape system can readily escape 50 feet from any point in buildings having varying heights. For example, the escape can be a descent of fifty (50) feet from an $80^{th}$ floor of a building, so that the fire fighter can gain safety on a lower floor, such as the $30^{th}$ floor. In addition, the fire fighter may choose to descend with no reduction in descent speed or at a desirable descent speed by activating a friction generating mechanism. The wearable escape system incorporates a heat resistant high strength rope. The outside of the rope is fabricated from Kevlar™, an aramid fiber. While the inside of the rope is fabricated from Vectran. The rope is folded in a parachute rope-like, organized manner into parallel segments within a heat shrink inner pouch which is entirely contained in a heat resistant outer pouch appointed to be attached to a belt or harness worn by the fire fighter. The parallel segments are restrained by a rope loop, which breaks as the rope is deployed. This organized arrangement of the rope allows high-speed deployment of the rope without rope tangling. In the first embodiment, the proximal end of the rope is attached to a lightweight high strength hook with a sharp point and the distal end is held in place within the inner pouch. In the second embodiment, the rope passes through a belay or friction-generating element, which is attached to the belt carrying the outer pouch by a carabineer or quick link prior to attachment of the rope with the hook. The belt also carries an additional hook pouch appointed to receive the hook. The belt may comprise a waist belt portion acting unilaterally to support the wearer. Alternatively and preferably, the belt has a harness with two straps which function as leg supports so that the belt, together with leg straps, supports the fire fighter properly during descent.

The fire fighter removes the hook from the hook pouch attached to the belt. The lightweight hook has a sharp point designed to penetrate sheet rock and other softer material including a mattress pad and the like to create a purchase point for supporting the weight of the fire fighter during descent. The hook has a large aperture with a diameter sufficient to integrate a carabineer portion intestinally therein. With this construction, the rope is made to surround a substantial object such as a bedpost and the rope is captured within the hook opening or carabineer portion. The rope is freely deployed through the belay or friction device and the fire fighter descend from a window or an opening in the high-rise building. By adjusting the tension and the orientation of the rope, the fire fighter can adjust the friction generated at the belay or friction generating device and control his rate of descent. In case of an emergency when the highest possible speed of descent is required, the fire fighter simply activates the descent device by squeezing a lever therein. Once the firefighter propels to safety, he then disengages a carabineer that attaches the belay or friction device to the belt, thereby allowing the firefighter to free himself from the system and to move out of the way of other firefighters that may also be escaping. When the rope is completely exhausted the distal end of the rope, containing a stopper knot, stops the free fall of the fire fighter.

Once the rope is pulled from the inner pouch, it cannot be re-inserted. That is, the rope deployment is a one-time event. The fire fighters escape device is made available for use by the insertion of a new inner pouch with organized rope into the outer pouch. This method of replacement provides a completely reliable fire fighter escape system capable of rapid deployment of the rope without any possibility of knots or tangle formation. The rope has a length ranging from 30 feet to 100 feet long and weighs up to 5 pounds. Preferably, the length of the rope is 40 feet long and preferably weighs up to 2 pounds. A length of 40 to 50 feet is typically sufficient for fire fighters to escape from a higher floor of a high-rise building to a lower floor where safety can be achieved. The lightweight high strength rope typically weighs 5 pounds and the overall fire fighter escape system weighs about 6 to 10 pounds and is effortlessly worn by a fire fighter, without hindering his ability to work in emergency situations. Moreover, since the belt and harness is at the waist location, and has a low profile, his arms and shoulders are free and are not burdened by the emergency escape device.

Significant advantages are realized by practice of the present invention. The key features of the fire fighters escape system include, in combination, the components set forth below:

1) A high strength heat resistant rope encased in an inner pouch in an organized 'parachute' rope like fashion providing reliable tangle free high speed deployment of the rope;

2) the distal end of the rope containing a stopper knot to prevent free fall of the escaping firefighter.

3) the proximal end of the rope is attached to a lightweight high strength hook having a large diameter aperture designed to wrap around radiators, pipes or a bed post, and provided with a sharp point for securing to a substantial penetrable object, a plaster wall or wooden window or door frame, the rope passing first through a belay or friction generating element prior to attachment with the hook;

4) the inner heat shrink pouch carrying the organized rope being securely held within a heat resistant outer pouch, which is adapted to be attached to a belt or harness about the waist of the fire fighter;

5) the heat resistant outer pouch is optionally intimately associated with a hook pouch appointed to receive and house the lightweight hook;

6) the belay or friction generating device attached to the belt by a carabineer or quick link may be detached from the system once the firefighter is to a safe area. This allows for the first escaping firefighter to remove himself from the system to make room for other escaping firefighters who choose to use the same path. The carabineer can not be opened while the firefighter is escaping or while the system is in use.

The fire fighter's personal escape system is used in accordance with the steps outlined below:

1) the fire fighter removes the hook from the hook pouch;

2) the fire fighter assesses the room for appropriate purchase point for attaching the hook which may be the sheet rock or bed mattress through which the sharp point of the hook is driven, or the aperture of the hook encircling a pipe, radiator or a bed post or using the rope to encircle any substantial object and using the aperture of the hook as a carabineer to capture the rope, or by using his hand tools such as a halligan, axe, or hook in conjunction with the aperture of the hook to provide for a substantial purchase point;

3) the fire fighter escapes by propelling through an open window or an opening in the high-rise building while being supported by the rope attached to the belt and harness with the speed of descent limited by the belay or friction-generating device;

4) the fire fighter adjusts the rate of descent by squeezing or releasing the handle of the belay or friction generating device controlling the rate of rope passing through the belay or friction-generating device in order to obtain a high rate of controlled descent during an emergency situation where every second counts;

5) once the firefighter propels to safety, he may release himself from the system by removing the carabineer or quick link attached to the harness, thereby allowing him to make room for other escaping firefighters who have chosen the same route of escape.

whereby the fire fighter is provided with a one-time use, personal lightweight escape system that reliably deploys an escape rope which is attached to a hook that provides multifunctional attachment possibilities.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1A:
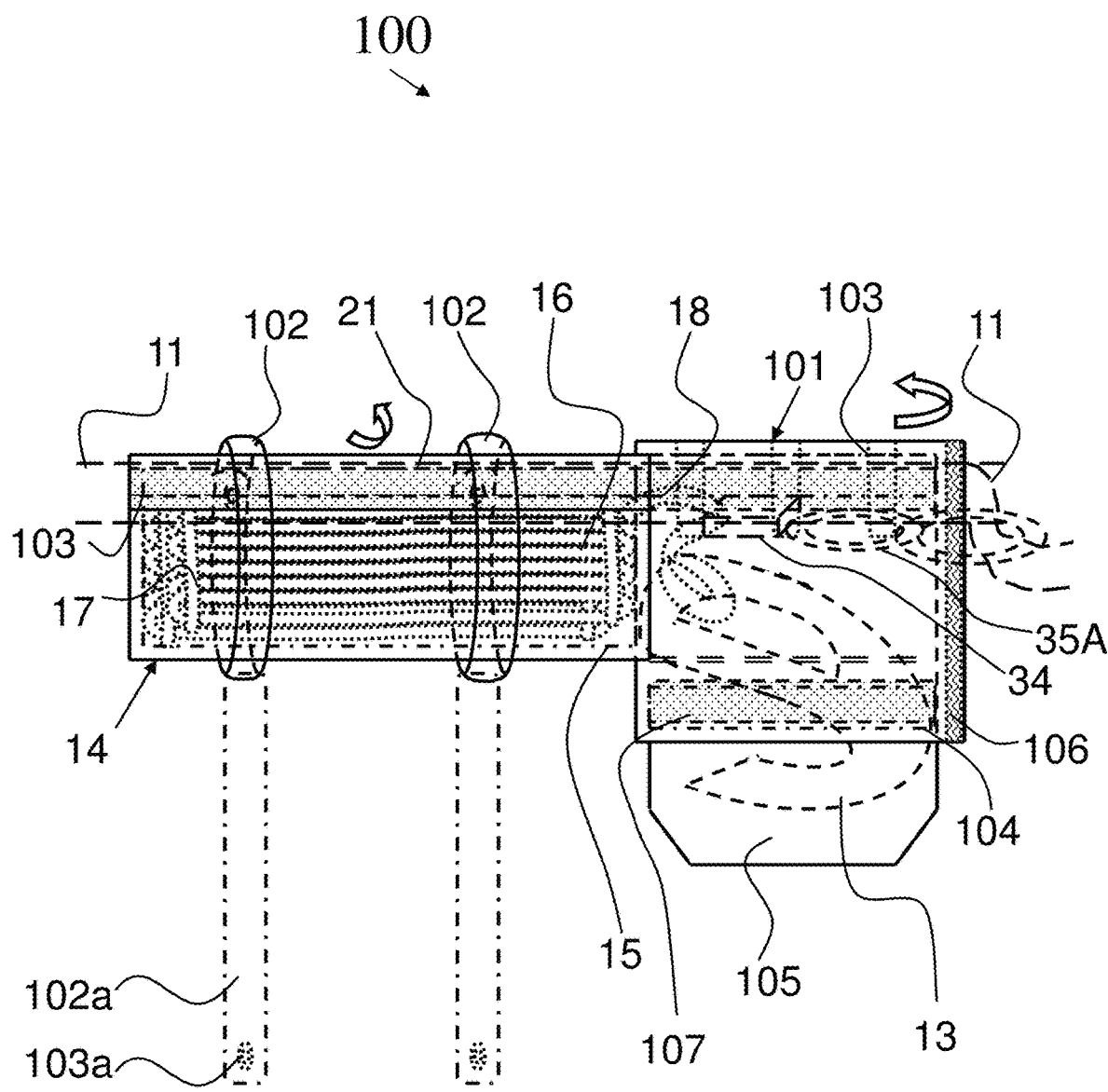
FIG. 1a is a front-view illustration of the fire fighter's personal escape system showing an embodiment wherein the outer pouch is connected to an optional hook pouch to form a one-piece unit.

This invention relates to a lightweight personal escape system worn and used by a fire fighter during an emergency situation. The system provides capability for a descent of approximately 50 feet without having to search for locations that provide basis for attachment of an escape rope. This lightweight system is worn by the fire fighter as an accessory that is securely attached to a belt. The system comprises a heat resistant outer pouch having a compartment for receiving and housing a lightweight specially shaped hook that is utilized as an escape hook and a heat shrink inner pouch. The outer pouch is composed of a heat resistant material. The inner heat shrink pouch houses a heat and abrasion resistant rope having a detachable device integrally associated therewith and being adapted to reduce the rate of descent of the escaping person.

Generally stated, the invention of personal escape system and method, which would be utilized by a fire fighter when descending from a high-rise building broadly comprises: (i) a multi-attachment escape hook: (ii) a heat and abrasion resistant rope; (iii) a heat shrink internal or inner pouch; (iv) a heat resistant external or outer pouch; (v) wherein the device includes a descent control mechanism; and (vi) wherein the device is appointed to be attached to a belt or harness.

The Fire Fighters Personal Escape System has applications in safety and preventative measures in the safety of fire fighters and other first response rescuers, including law enforcement and military personnel. Advantageously, the Fire Fighter's Personal Escape System can be utilized to save lives, while providing a lightweight safety device that can be effortlessly worn on the person without being cumbersome or bulky.

The device has a lightweight escape hook preferably made from a high strength iron, which can support more than 6000 pounds. Optionally, the hook may be made from high strength titanium alloy material, which can support more than 6000 pounds. The hook is specially dimensioned with an opening of 2.125 to 3.5 inches at its widest point to fulfill multiple fastening methods. Advantageously, the hook has a size and shape especially well suited to fit about the radius of most radiators, which are located near a window used for escape purposes. The shape of the hook facilitates its use as a choker, and facilitates placement of a Halligan tool, or other firefighting hand tool, through the handle of the hook as a method to secure the hook to a wall. The sharp tip of the hook can make its own "purchase" point. For example, the tip can be driven into sheet rock, a wall, a chair, a mattress, or other penetrable object capable of acting as a support object. It doesn't have to be wrapped around something to provide an anchoring function. The anchor point options provided by the hook provide a significant advantage. A strong anchor is expeditiously effected, markedly enhancing the system's utility. The hook can be also used as a carabineer—to put multiple pieces of hardware in combination with the system. For example, the hook can be thrown around the leg of a large bed, making a loop around the leg, to anchor the device before repelling from a window. In addition, preferably the Fire Fighter's Personal Escape System is bar coded or assigned serial numbers for accountability. In this manner, all parts of the system are bar coded for readily identifying the components of any given system. That is to say, the rope, inner pouch, outer pouch, and hook each are provided with an inter-related bar code unique to a fire fighter's individual escape system, so that one can readily identify each individual's systems' components.

The rope is preferably composed of two portions, including an outer sheath and an inner core. The outer sheath of the rope is composed of a high strength abrasion resistant material, such as Kevlar™ aramid fiber, which exhibits a higher heat and ware resistance than nylon or polypropylene materials. Kevlar™ is commonly used in bulletproof vests. The inner core of the rope is preferably composed of a material having a high tensile strength, such as Vectran. The device comprises about 30 to 100 feet of rope, preferably comprises 40-50 feet of rope, and most preferably comprises 40 feet of rope. A length between 40-50 feet of rope is generally sufficient for most fire fighters to get out of harms way. The overall weight of the rope is up to 5 pounds, and preferably about 2 pounds, and is easy to carry as a personal escape device for a fire fighter. The rope is organized and laid in a manner similar to that of a parachute rope so that the rope is freely released from storage as needed by the fire fighter during an escape event.

The organized rope is entirely contained in a pouch that is covered with a heat shrink material. Conveniently, this pouch containing the organized rope may be fashioned as a belt that is worn around the waist of a firefighter with attachment on a class I, II, or III harness. Preferably, the pouch is adapted to be attached to an existing belt or harness. Moreover, the outer pouch, which is adapted to receive and house the inner pouch and rope, is preferably attached to a hook pouch, adapted to receive and house the hook, thereby forming a unilateral or one-piece pouch arrangement. Optionally, the outer pouch and the hook pouch are two separate, discrete, pouches.

The proximal end of the rope is attached to the hook. The hook may pass through a belay, a multiple aperture tab, or a friction generation element so that the friction generated at the rope facilitates a controlled descent of the fire fighter. The fire fighter reduces rope friction at the multiple aperture tab by moving the rope, or by squeezing the handle of the descender to increase the speed of the descent, thereby effecting a controlled descent.

Key components of the Fire Fighter's Personal Escape System include, in combination, the components set forth below:

1. a specially shaped lightweight high strength hook designed to capture radiators, bedposts, pipes and other attachment objects;
2. the hook having a pointed sharp tip that serves to create an anchor or purchase point in sheet rock, a mattress or other penetrable anchor locations;
3. the hook having a closed aperture to be used as a choker or as means for using other fire fighter hardware in conjunction therewith, including a Halligan tool, in order to establish a secure attachment point;
4. the hook being attached to the proximal end of a strong lightweight heat resistant rope composed of a Kevlar™ aramid fiber outer jacket and a Vectran core, or other suitable materials;
5. the rope arranged as a set of parallel looped layers in a heat shrink inner pouch for easy snag-free one time delivery of the rope on demand during a fire fighters escape;
6. the distal end of the rope having a stopper knot to prevent the firefighter from going into free-fall;
7. the rope passing through a belay or friction generating element;
8. the inner pouch being placed in an outer pouch appointed to safely accommodate the inner pouch, and a further hook pouch being provided to house the lightweight hook having a pointed sharp tip, and said outer pouch and said hook pouch being further adapted to be attached to a belt worn by the fire fighter; and
9. the belay or friction device being attached to the belt associated with the outer pouch by a carabineer;
10. the belt being a class I, II, III harness. Class I harnesses include devices generally comprising a waist belt; Class II harnesses include devices generally comprising a waist belt and leg loops; and Class III harnesses include devices having a waist belt, leg loops and an upper body shoulder straps.

whereby the fire fighter is equipped with a personal escape system that affords reliable attachment of the escape system to readily available objects that are commonly present within a building, allows controlled descent of the fire fighter using a friction device, and has means to defeat the friction device, to thereby provide for fast descent. The hook of the system also has a closed elliptical aperture for using (carrying) a Halligan tool or other fire fighting hardware to secure the hook to a structure (and can be used to attach other system hardware).

FIG. 1a illustrates a front-view of the fire fighter's personal escape system showing an embodiment wherein the outer pouch is connected to an optional hook pouch, shown generally at 100. A belt portion of safety harness 11 is shown, appointed to be placed around a fire fighter's waist. The fire fighter's personal escape system 100 includes a high strength heat resistant rope 16 organized in a discrete parallel relationship held by readily breakable threads 17 providing reliable tangle free high speed deployment so that a fire fighter can escape a perilous situation with rapid descent. Rope 16 is housed within an inner pouch 15. In turn, inner pouch 15 and visa vie rope 16, is housed within an outer pouch 14. Access into outer pouch 14 is achieved through flap 21, herein shown on the horizontal top plane of outer pouch 14. Flap 21 remains securely closed by way of closure means, preferably hook and eye or Velcro closure. Outer pouch 14 includes attachment means 102 appointed to attach outer pouch 14 to a belt portion of safety harness 11. Herein, attachment means 102 is shown as straps which are fixed to the back portion of outer pouch 14 and extend around outer pouch 14 and close at strap closure 103, preferably being a snap or a hook and eye Velcro closure. Attachment means 102 and closure 103 are shown in the open configuration at 102a and 103a as when the outer pouch 14 is not attached to safety harness 11.

Continuing with FIG. 1a, outer pouch 14 herein is fixedly attached to a hook pouch 101. Hook pouch 101 includes a hook closure flap 104, securing means 107, and a pouch pocket 105. Securing means 107 is herein shown as a hook and eye configuration or Velcro. Preferably hook closure flap 104 opens laterally and exposes pouch pocket 105. Pouch pocket 105 is appointed to receive hook 13. Hook 13 is a lightweight hook adapted to engage with a substantial object and to act as a support structure so that the fire fighter can assume a secure, rapid descent. Optionally, hook closure flap 104 includes an internal grasping portion 106, such as an internal rope portion, so that hook closure flap 104 can be quickly and readily opened to gain immediate access to pouch pocket 105 and hook 13. Rope 16 has a proximal end 18 which is securely attached to hook 13. In addition, in one embodiment, proximal end 18 of rope 16 engages with a belay or friction generating device 34 which may in turn engage with at least one easily detachable carabineer type fastener 35A provided for additional safety (see FIG. 5 for discussion on this alternative embodiment). Hook pouch 101 is provided with hook pouch attachment means 103 in order to attach hook pouch 101 to the belt portion of safety harness 11. Preferably, hook pouch attachment means 103 includes at least one strap that removably receives the belt of the safety harness 11 and closed by way of hook and eye closure, or Velcro.

Figure 1B:
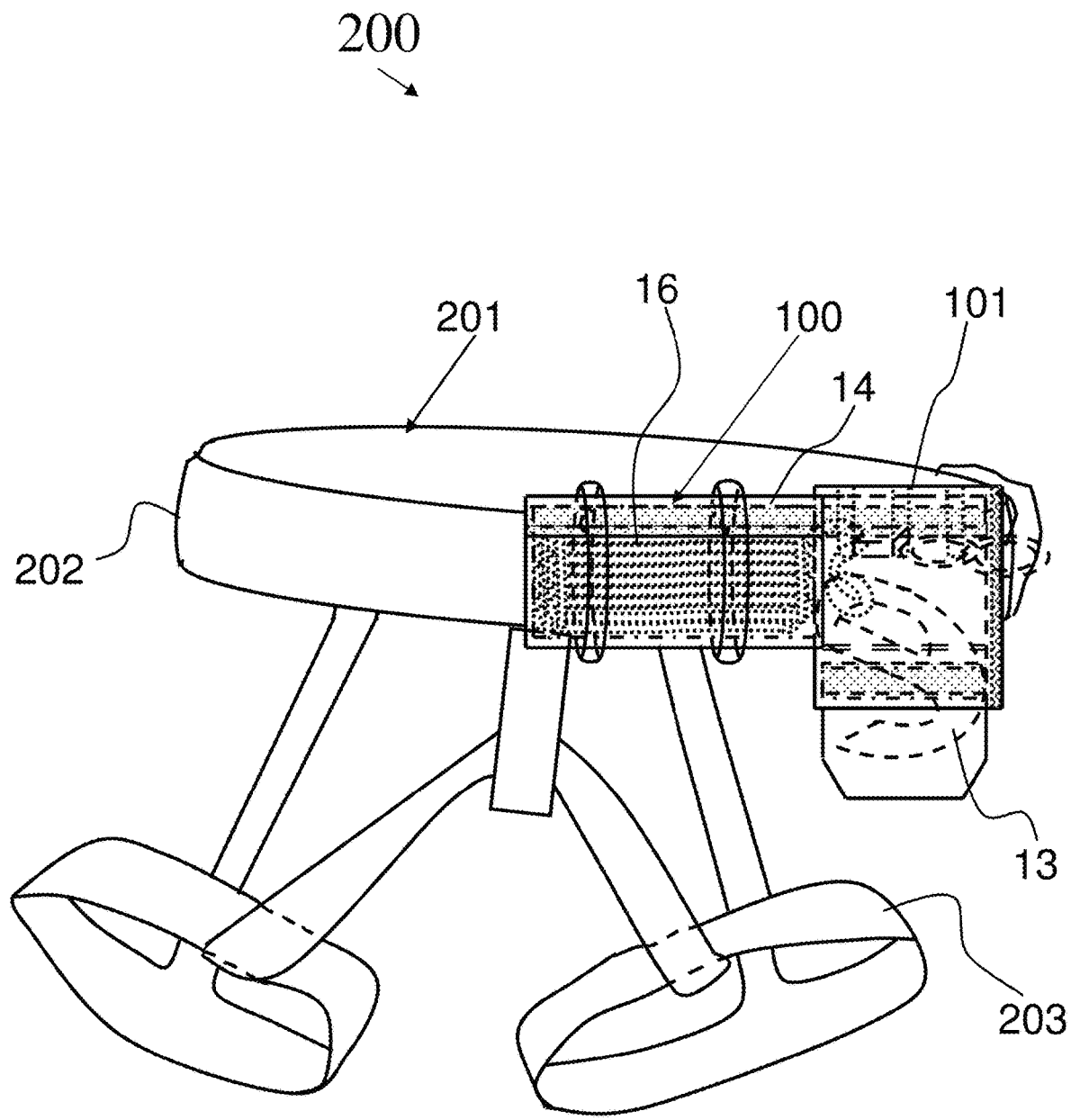
FIG. 1b is a front-view illustration of the fire fighter's personal escape system showing the embodiment of FIG. 1a attached to a harness.

FIG. 1b illustrates a front-view of the fire fighter's personal escape system showing the embodiment of FIG. 1a attached to a harness, shown generally at 200. A harness and belt apparatus 201 comprises a belt portion 202 and leg portions 203 appointed to be placed around a fire fighter's waist and legs. As set forth in the discussion on FIG. 1a, the fire fighter's personal escape system 100 includes a high strength heat resistant rope 16 organized in a discrete parallel relationship held by readily breakable threads. Rope 16 is housed within an inner pouch, which in turn is housed within an outer pouch 14. Outer pouch 14 includes attachment means appointed to attach outer pouch 14 to belt portion 202 of safety harness 201. Outer pouch 14 herein is fixedly attached to a hook pouch 101. Hook pouch 101 includes a hook closure flap, securing means, and a pouch pocket. The pouch pocket is appointed to receive hook 13.

Figure 2:
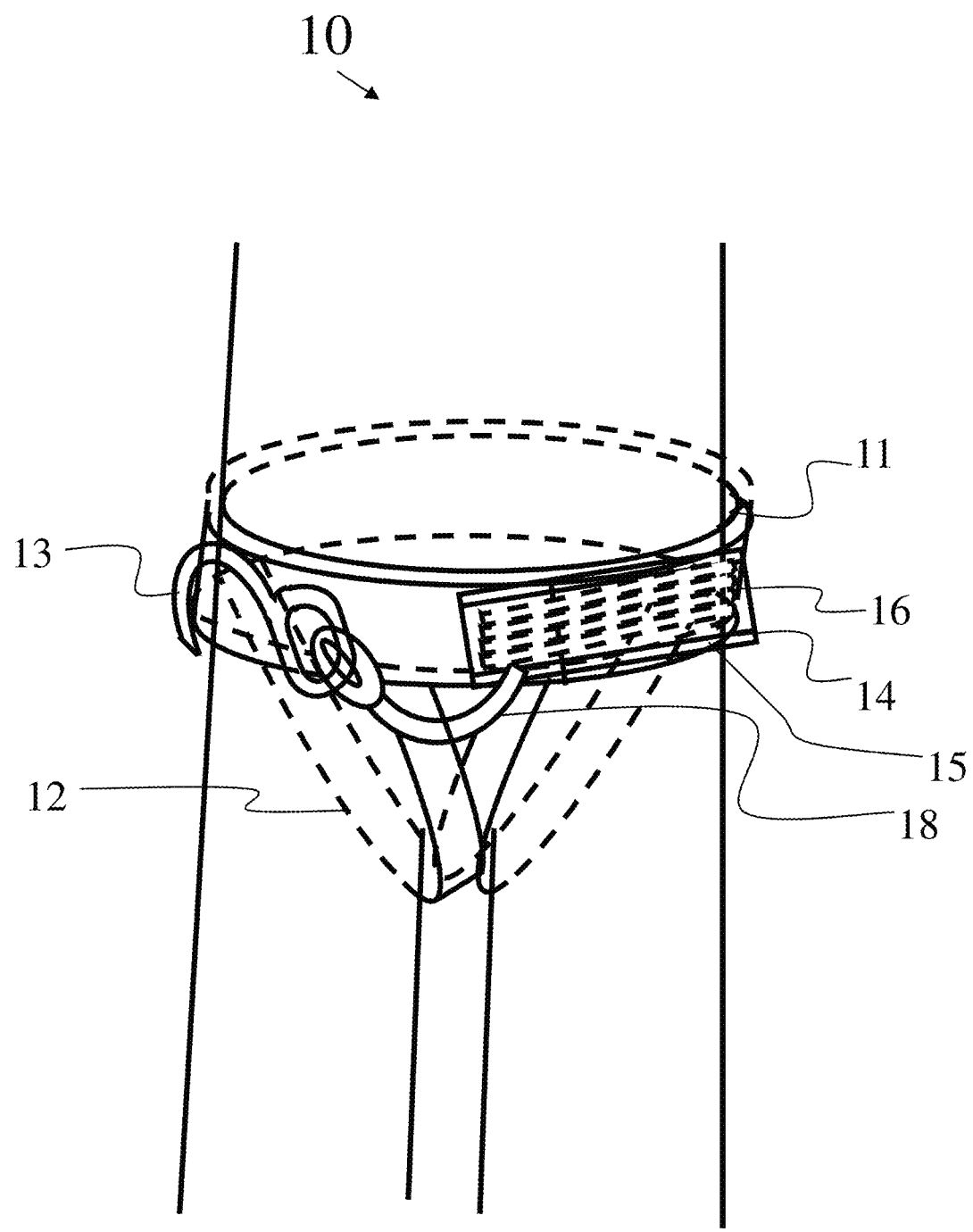
FIG. 2 is an illustration of the fire fighter's personal escape system showing an embodiment of the outer pouch, inner pouch, rope and hook attached to a belt and harness.

FIG. 2 illustrates an embodiment of the fire fighters personal escape system transported by a firefighter, shown at 10. The fire fighter's personal escape system is normally set up on the right side of the fire fighter, but the system is designed to be used on either the right or left side of the fire fighter. Safety harness 11 is shown having leg portions 12. The safety apparatus of the fire fighter's personal escape system is removably attached to the harness 11 by way of attachment means, such as through a snap system, hook and eye, strap system, or the like. As shown, external or outer pouch 14 (along with internal or inner pouch 15 and rope 16) is removably attached to the waist portion of harness 11. Escape hook 13 appends off a proximal end 18 of rope 16. The belay or friction generating device is not included in this first embodiment and the fire fighter descends at the highest speed possible.

Figure 3:
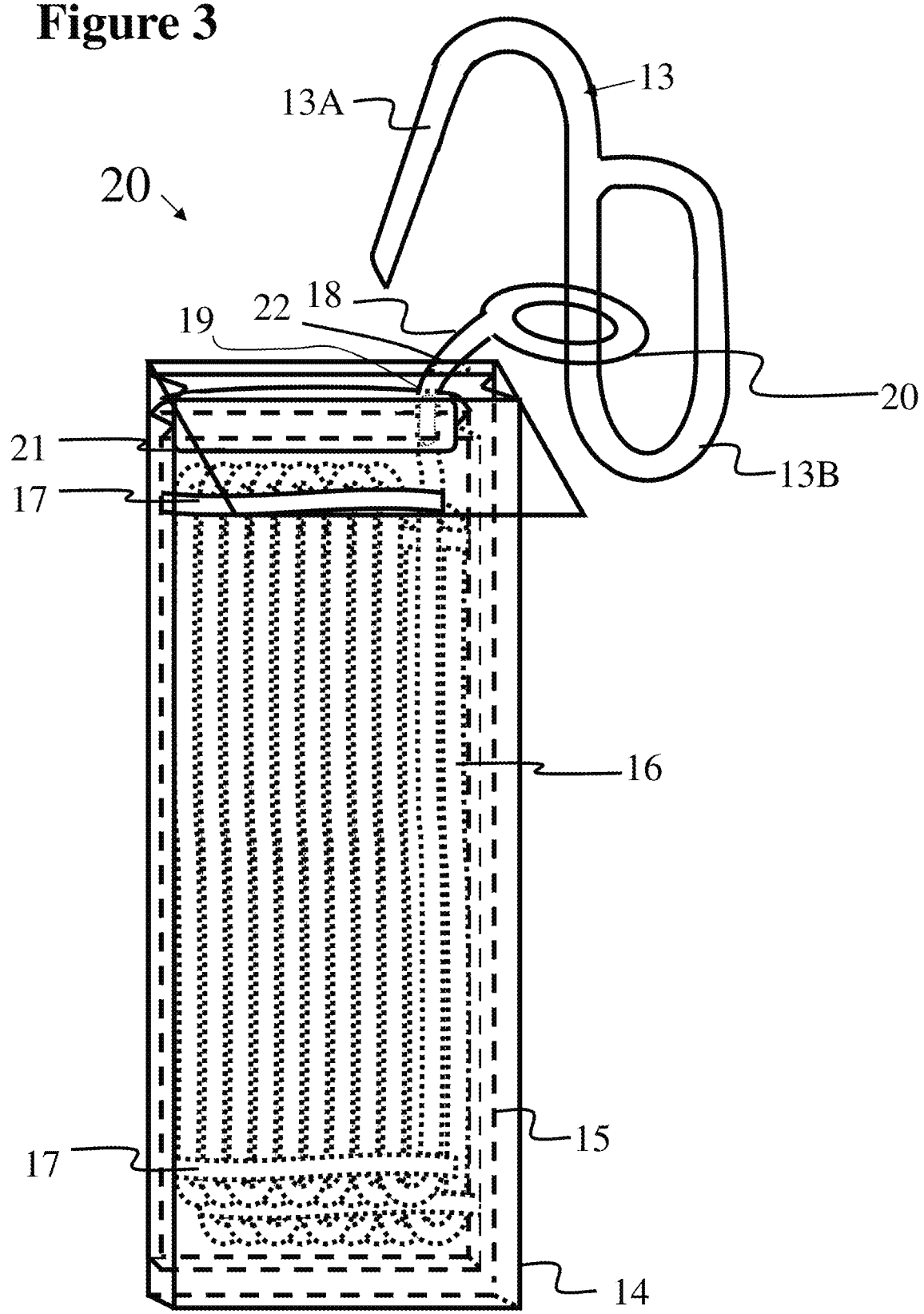
FIG. 3 is an illustration of the inner pouch, rope, and hook of the fire fighter's personal escape system.

FIG. 3 illustrates the details of the fire fighter's personal escape system, showing the escape apparatus generally at 20. Escape hook 13 comprises a first portion 13A and a second portion 13B. Second portion 13B is connected to heat resistant rope 16 by way of attachment means 20, which is in turn interstitially attached to the heat resistant rope 16 by way of external rope portion or proximal end 18. Attachment means 20 is shown as a loop, fixedly attached to second portion 13B of escape hook 13. Alternatively, the attachment means 20 can consist of a variety of attachment mechanisms. Proximal end 18 extends out of internal or inner pouch 15 and transverses through internal or inner aperture 19 of inner pouch 15, and further transverses through external or outer aperture 22 in flap 21 of outer pouch 14. Herein, outer pouch 14 is illustrated having flap 21 on a vertical end. Alternatively, and as illustrated in FIG. 1, flap 21 is on a horizontal side edge of outer pouch 14. Both internal pouch 15 and external pouch 14 are composed of heat resistant, flame resistant materials. Preferably, internal pouch 15 is further composed of a transparent material in order to allow a user to readily view heat resistant rope 16 located therein the internal pouch 15. The heat resistant rope 16 is fixed within the internal pouch 15, and is arranged in a "parachute" type arrangement. That is to say, heat resistant rope 16 has lateral sections arranged parallel to one another and fixedly positioned by threads 17, to form uniform, arranged layers. These threads shown at 17 break off as the rope 16 is deployed. In this formation, heat resistant rope 16 remains in a manner that prevents tangling or knotting of the heat resistant rope 16 as it is deployed during an emergency situation. After the heat resistant rope 16 is deployed from the internal pouch 15 and visa vie the external pouch 14, the system is not re-usable, but must be disposed of. This prevents unnecessary risks that can occur if the system has been damaged through use, such as a chafed heat resistant rope 16 or knotted heat resistant rope 16 which can cause malfunctioning in the deployment of the heat resistant rope 16.

Figure 4:
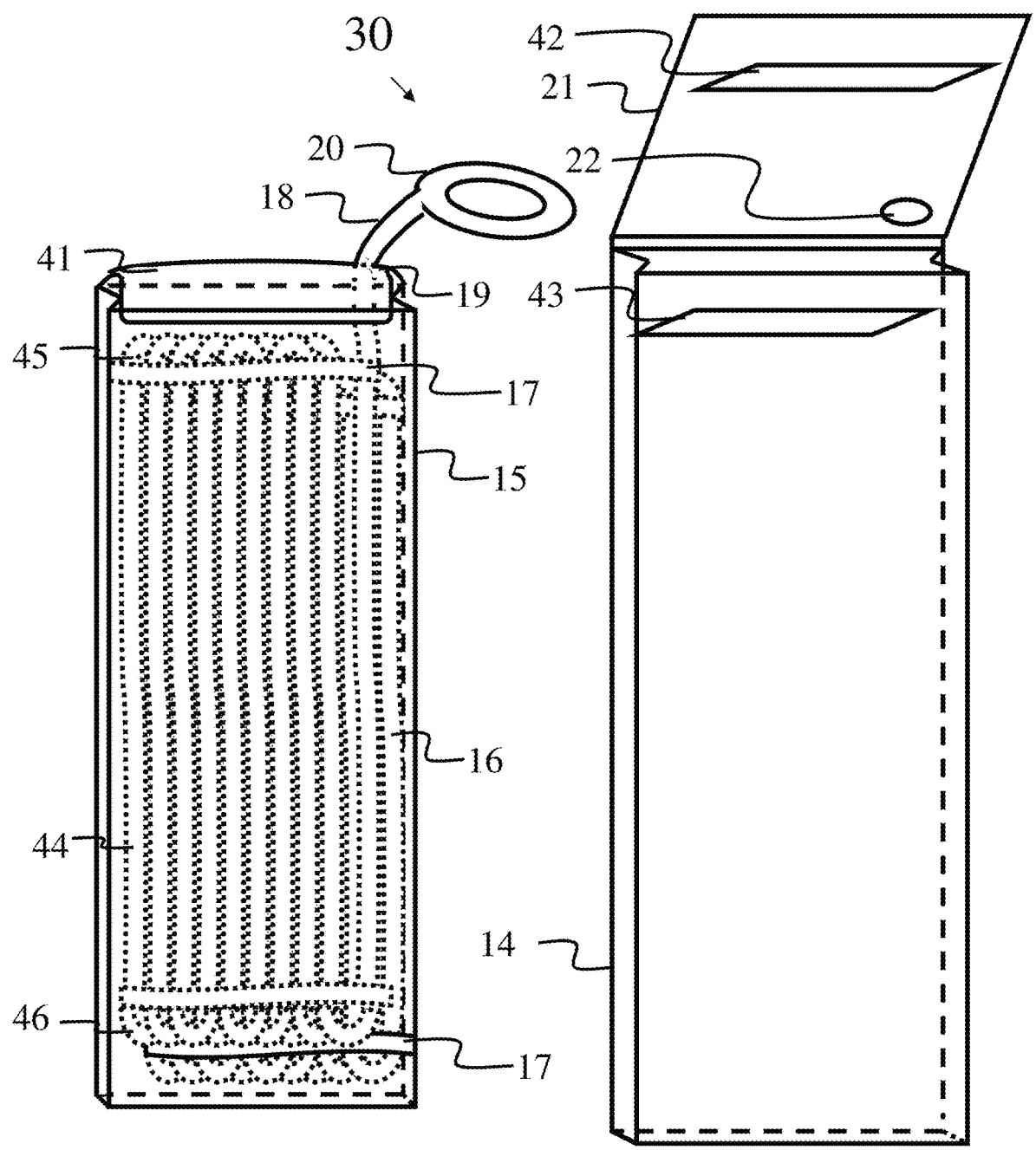
FIG. 4 is an illustration of the details of insertion of the inner pouch into an embodiment of the outer pouch of the fire fighter's personal escape system.

FIG. 4 illustrates the details of insertion of the inner pouch into an embodiment of the outer pouch of the fire fighter's personal escape system. The figure shows generally at 30, the outer pouch 14 and inner pouch 15, positioned side by side. The outer pouch 14 is provided with an aperture for receiving and housing inner pouch 15. The external pouch 14 has a flap 21, shown on the top thereof in a vertical arrangement, adapted to be in a closed configuration and an open configuration; Herein flap 21 is shown in the open configuration. Flap 21 is in the open configuration when the external pouch 14 is receiving the internal pouch 15. Otherwise, flap 21 is in the closed configuration. Flap 21 and outer pouch 14 are provided with mating closure means, 42 and 43, respectively. Mating closure means, 42 and 43 are preferably comprised of a hook and eye or Velcro arrangement. Inner pouch 15 comprises a front, back, left and right sides, and a bottom to create an aperture for receiving and housing heat resistant rope 16. Inner pouch 15 has a cover 41 provided with an internal aperture 19, from which proximal end 18 of heat resistant rope 16 extends from the internal or inner pouch 15 into the atmosphere. The proximal end 18 of heat resistant rope 16 is further provided with attachment means 20, herein shown as a loop, alternatively may be a secure knot. Preferably, a polymeric coating is applied to the secure knot, so that fraying or loosening of the knot is mitigated. Attachment means 20 is adapted to fixedly attach to the second portion (see 13B in FIG. 3) of the escape hook (see 13 in FIGS. 2 and 3). The distal end of the heat resistant rope 16 is fixed within the internal pouch 15, and the overall arrangement of the rope is arranged in a "parachute" type arrangement. That is to say, heat resistant rope 16 has lateral sections 44 arranged in a parallel conformation to one another. These lateral sections 44 of rope 16 are fixed in the parallel conformation by way of threads 17. Threads 17 are located on top end 45 and on bottom end 46 of each of the lateral sections 44. These threads 17 break readily with the application of force created during deployment of the rope 16. Threads 17 are provided to prevent the heat resistant rope 16 from tangling or knotting during deployment and storage, so that the rope 16 glides effortlessly from the inner pouch 15 and outer pouch 14 bringing the fire fighter to safety. After the heat resistant rope 16 is deployed from the inner pouch 15 and the outer pouch 14; the system is not re-usable, but must be disposed of. This prevents unnecessary risks that can occur if the system has been damaged through use, such as a chafing or knotting of the rope 16 which can cause deployment malfunctioning of rope 16.

Figure 5:
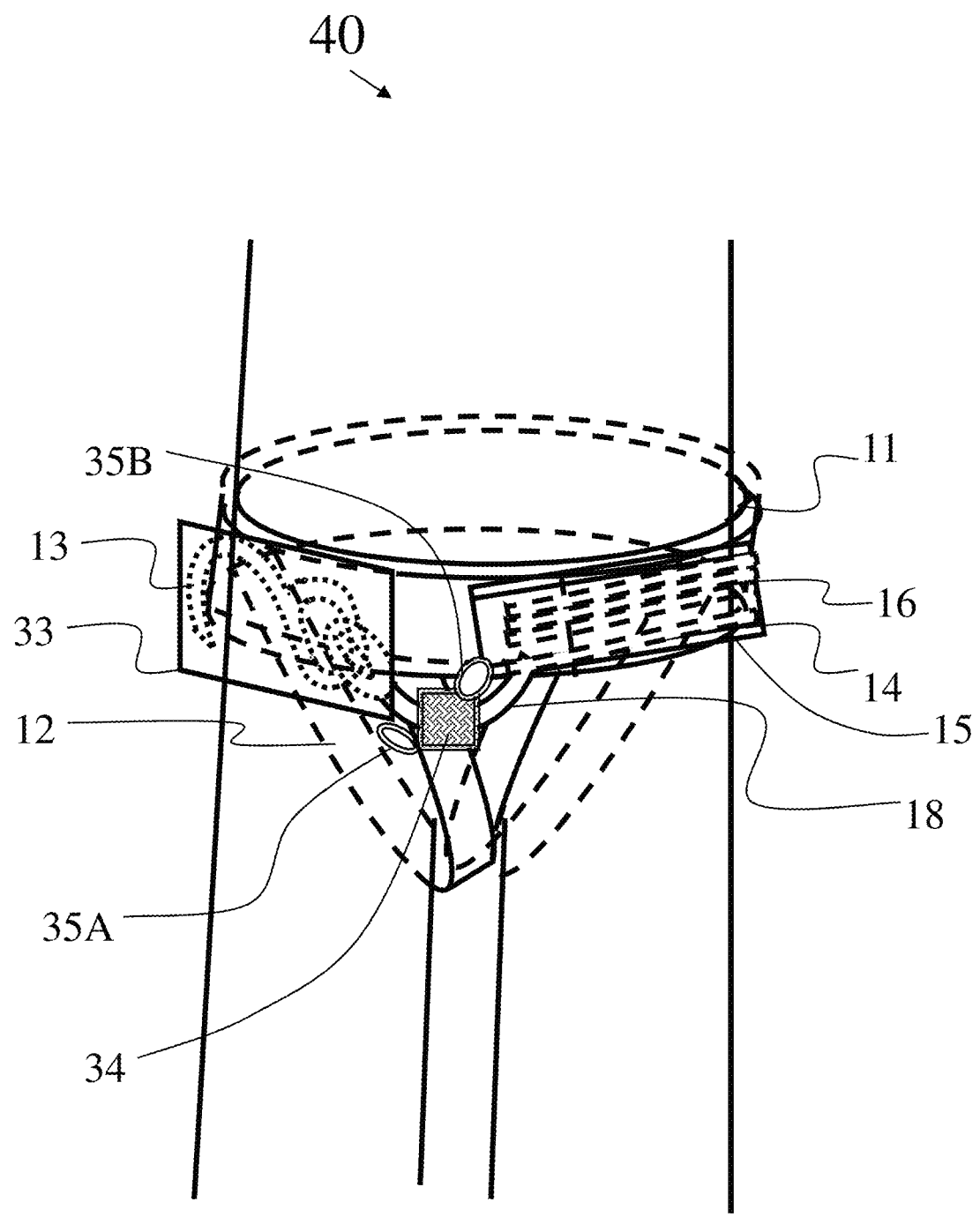
FIG. 5 is an illustration of the second embodiment of the fire fighter's personal escape system with a belay or friction-generating element.

FIG. 5 illustrates, at 40, the second embodiment of the fire fighter's personal escape system with a belay or friction generating element transported by a firefighter. Safety harness 11 is shown having leg portions 12 and an outer hook pouch 33 to accommodate the escape hook 13, hidden within the outer pouch. A belay or friction device 34 is attached to the safety harness 11 and outer pouch 14 using two easily detachable carabineer type fasteners 35A and 35B. The two carabineers are provided for additional safety, though one carabineer is sufficient to attach the belay or friction-generating element to the belt. The proximal end 18 of the rope 16 passes through the belay or friction device 34 limiting the rate at which the fireman descends. In an emergency, the fireman can release the fasteners 35A and 35B providing rapid decent. The safety apparatus of the fire fighter's personal escape system is removably attached to the harness 11 by way of attachment means, such as through a snap system or the like. As shown, outer pouch 14 (along with inner pouch 15 and rope 16) is removably attached to the waist portion of harness 11. Escape hook 13 appends off proximal end 18 of rope 16 and is now located within the outer pouch 33.

Figure 6:
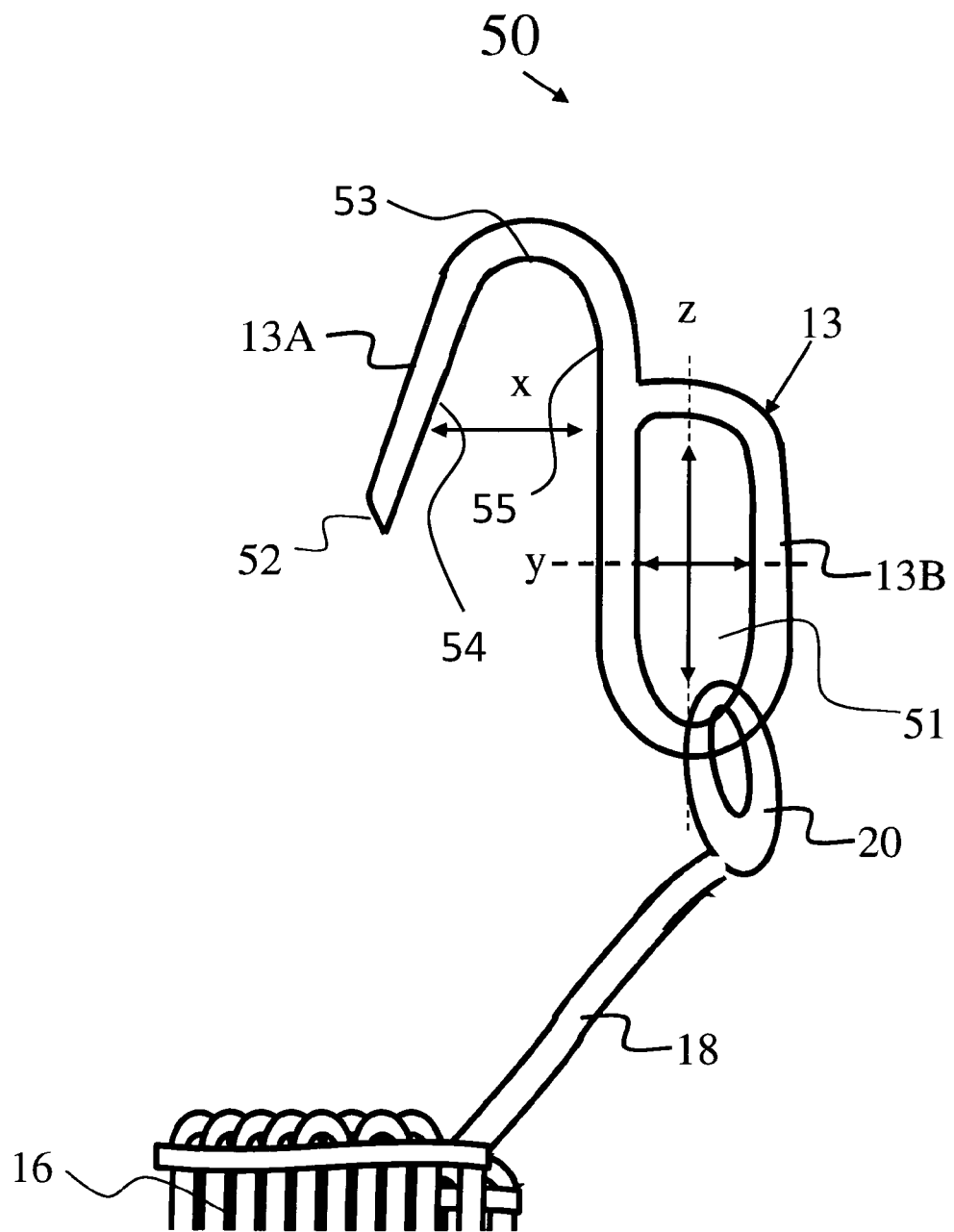
FIG. 6 is an illustration of the escape hook 13 of the fire fighter's personal escape system.

FIG. 6 illustrates, at 50, the escape hook 13 of the fire fighter's personal escape system. Escape hook 13 comprises a first portion 13A and a second portion 13B. Second portion 13B is adapted for connection to heat resistant rope 16 by way of attachment means 20 which is in turn interstitially attached to the heat resistant rope 16 by way of proximal end 18. Herein, attachment means 20 is shown as a loop fixedly attached to second portion 13B of escape hook 13. Alternatively, the attachment means 20 can consist of a variety of attachment mechanisms such as knot, preferably secured by a polymeric coating. Second portion 13B has a hook aperture 51 adapted for receiving attachment means 20 and preferably, attachment means 20 is integrated by way of factory installation with hook aperture 51 and second portion 13B. Second portion 13B may further comprise a carabineer, as is readily sold on the market. The hook aperture 51 of the second portion may be used to carry specific tools including a Halligan tool. The hook aperture 51 preferably has a height "z" located centrally (shown as a phantom line) ranging from 3 to 5 inches, and preferably having a height "z" of 3⅓ inches. Hook aperture 51 preferably has a width "y" located centrally (shown as a phantom line) ranging from 1 to 3 inches, and preferably having a width y of 1⅓ inches. The height "z" and width "y" of second portion 13B are determined so that a hand, preferably that of a typical fire fighter having an average hand size, can readily fit into hook aperture 51 so that the fire fighter can have optimal force when engaging the escape hook 13 with an object by way of first portion 13A. First portion 13A has a hook tip 52 that has a sharp nature so that hook tip 52 can readily penetrate through an object, such as a couch, sofa, chair, or the like. First portion 13A forms a hook opening extending towards the sharp tip point 52 and has a diameter x. The diameter x preferably ranges from 2⅛ to 2¼ inches so that the hook 13 can readily fit around most radiators and steam pipes associated with buildings and private dwellings. The hook opening of first portion 13A has a top interior hook wall 53, a hook tip side wall 54, and hook opening side wall 55. The second portion 13B readily can be hooked around window studs, radiators, beams, piping, and the like, so that the firefighter can utilize the object as a grounding leverage as the fire fighter engages the rope 16 and propels out of the dangerous area to safety. Hook 13 is composed of a lightweight material, yet has significant durability and strength to support the weight of a firefighter while descending at least 50 feet. The hook 13 is preferably made from a high strength iron, which can support more than 6000 pounds. Optionally, the hook may be made from high strength titanium alloy material, which can support more than 6000 pounds.

Figure 7:
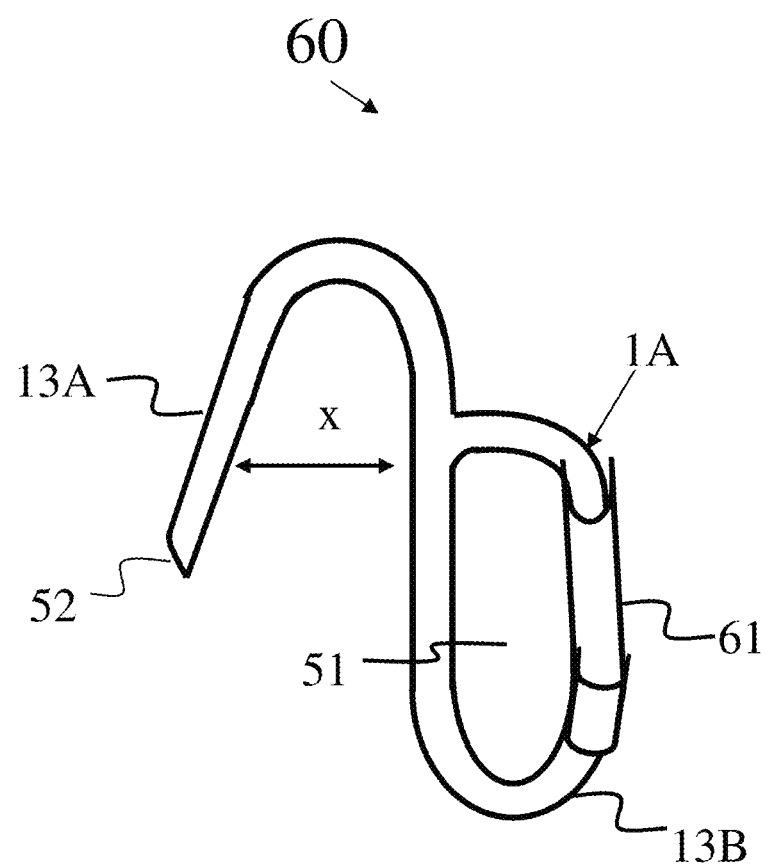
FIG. 7 is an illustration of the carabineer configuration of the escape hook.

FIG. 7 illustrates, at 60, a carabineer configuration of the escape hook 13. The second portion 13B is provided with an integrated carabineer clip 61. This clip may be disengaged to capture a rope that surrounds a substantial object or be used to attach other fire fighter's tools.

Figure 8:
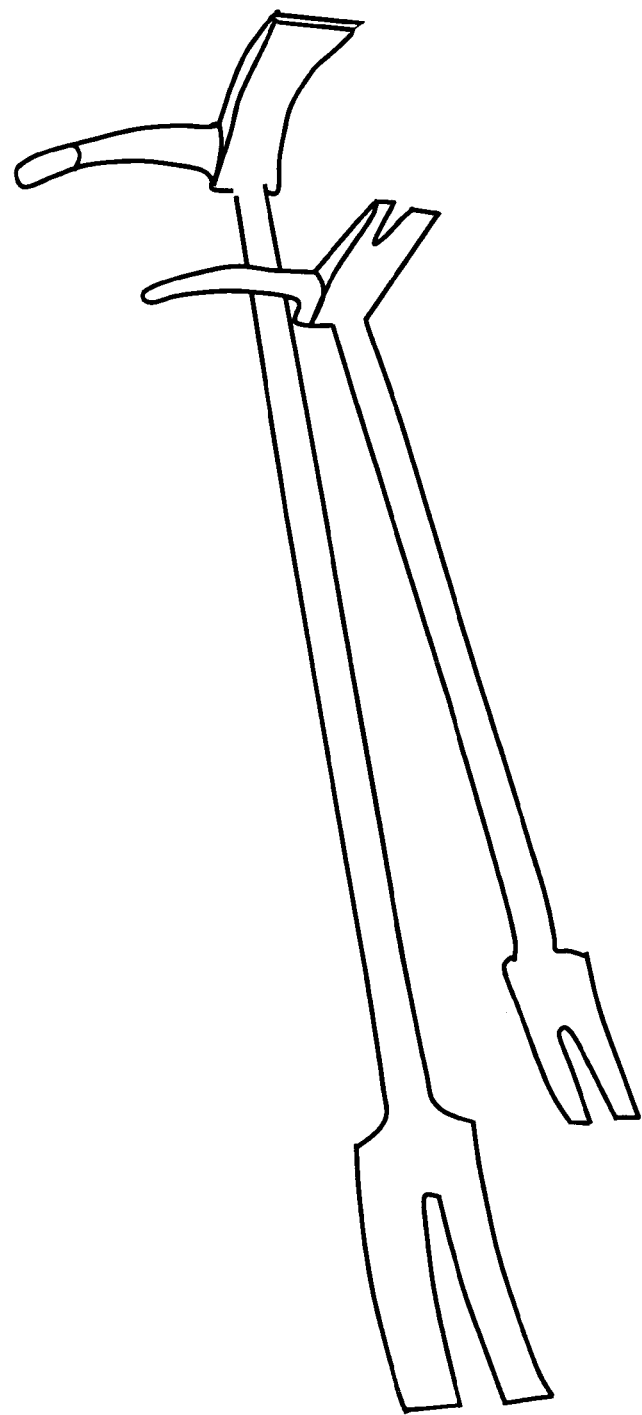
FIG. 8 is a photograph of a Halligan tool.

FIG. 8 illustrates a photograph of a Halligan tool, a forcible entry tool PRO-BAR. Developed by a Forcible Entry Instructor of the N.Y.F.D, this Halligan-type forcible entry tool is the result of years of re-search and countless interviews with fire chiefs and firefighters in the N.Y.F.D. The Halligan tool comprises at least one fork region and leverage region, with points that are designed with correct lengths and tapers to enable the firefighter to effect easy entry or penetration into a building. The tool provides maximum leverage for entry. The tool is a one-piece construction of alloy steel and is drop forged and is typically 30 inches long. This tool can be contained within the aperture 51 of the escape hook 13 of FIGS. 5, 6, and 7 and is used without a hook pouch as indicated in FIG. 2.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hook, consisting of:
   a. a first portion forming a hook opening having a top interior hook wall, a hook tip, a hook tip side wall, and a hook opening side wall, said hook tip side wall of said hook opening of said first portion extending toward said hook tip, said hook opening having, at its widest point, a diameter ranging from 2.125 inches to 3.5 inches, and said first portion being open and able to fit around radiators, steam pipes and bed posts associated with buildings and private dwellings;
   b. said hook tip being a pointed sharp tip integrated with said first portion so that said hook tip can readily penetrate through a plaster wall, gypsum wall, sheet rock, wooden frame, door frame, mattress pad, couch, sofa or chair;
   c. a second portion having a central aperture and an attachment means for connection to a rope, wherein said central aperture has width "y" extending between inside portions thereof along a horizontal plane and a height "z" extending between a lower and upper portion of said central aperture along a vertical plane;
   d. said first portion and said central aperture of said second portion sharing a portion of a side wall which forms a portion of said aperture; and
   said shared side wall having a hook opening side forming said hook opening side wall of said first portion and a central aperture side, and said shared portion of said side wall's hook opening side and central aperture side being substantially parallel to one another, said hook opening side wall extending past said central aperture side of said shared portion of said side wall and said top interior hook wall of said hook opening of said first portion being located higher than or above said upper portion of said central aperture, and said shared portion of said side wall is substantially parallel to said vertical plane
   f.

2. A hook as recited by claim 1, wherein said second portion with said central aperture has an ellipse shape and is formed as a carabiner to be readily disengaged to capture a rope surrounding a substantial object.

3. A hook as recited by claim 1, wherein said second portion with said central aperture forms a carabiner that can be readily disengaged to attach other fire fighter tools.

4. A hook as recited by claim 1, wherein said hook is composed of a high strength iron.

5. A hook as recited by claim 1, wherein said hook is composed of a high strength titanium alloy.

6. A hook as recited by claim 1, wherein said central aperture of said second portion is elliptical.

7. A hook as recited by claim 1, wherein said central aperture has a height of at least about 3⅓ inches and a width of at least about 1 to 3 inches and is appointed for receiving a hand into said elliptical central aperture when engaging said hook.

8. A hook, consisting of:
  a. a first portion forming a hook opening having a top interior hook wall, a hook tip, a hook tip side wall, and a hook opening side wall, said hook tip side wall of said hook opening of said first portion extending toward said hook tip, and said hook opening having, at its widest point, a diameter ranging from 2.125 inches to 3.5 inches, and said first portion being open and able to fit around radiators, steam pipes and bed posts associated with buildings and private dwellings;
  b. said hook tip being a pointed sharp tip integrated with said first portion so that said hook tip can readily penetrate through a plaster wall, gypsum wall, sheet rock, wooden frame, door frame, mattress pad, couch, sofa or chair;
  c. a second portion having a central aperture and an attachment means for connection to a rope, wherein said central aperture has width "y" extending between inside portions thereof along a horizontal plane and a height "z" extending between a lower and upper portion of said central aperture along a vertical plane;
  d. said first portion and said central aperture of said second portion sharing a portion of a side wall which forms a portion of said aperture; and
  e. said shared side wall having a hook opening side forming said hook opening side wall of said first portion and a central aperture side, and said shared side wall's hook opening side and central aperture side being parallel to one another, said hook opening side wall extending past said central aperture side of said shared side wall and said top interior hook wall of said hook opening of said first portion being located higher than or above said upper portion of said central aperture, and said shared side wall is parallel to said vertical plane;
  said central aperture having an opposing side wall that is opposite from said shared portion of said side wall and forms a portion of said aperture, and said first portion and second portion abutting one another
  g.

9. A lightweight high strength hook, consisting of:
  a. a first portion forming a hook opening having a top interior hook wall, a hook tip side wall, and hook opening side wall, said hook tip side wall of said hook opening of said first portion extending toward a hook tip, said hook opening having, at its widest point, a diameter ranging from 2.125 inches to 3.5 inches, and said first portion being open and able to fit around radiators, steam pipes and bed posts associated with buildings and private dwellings;
  b. a pointed sharp tip integrated with said first portion, so that said hook tip can readily penetrate through a plaster wall, gypsum wall, sheet rock, wooden frame, door frame, mattress pad, couch, sofa or chair;
  c. a second portion having an central aperture and an attachment means for connection to a rope, said central aperture having width "y" extending between inside portions thereof along a horizontal plane and a height "z" extending between a lower and upper portion of said central aperture along a vertical plane;
  d. said first portion and said central aperture of said second portion sharing a portion of a side wall which forms a portion of said aperture;
  e. said top interior hook wall of said hook opening of said first portion being located higher than or above said upper portion of said central aperture, and said shared portion of said side wall is substantially parallel to said vertical plane; and
  said hook opening side wall extending past said upper portion of said central aperture
  g.

10. A lightweight high strength hook as recited by claim 9, wherein said central aperture has an ellipse shape with a first side and a second side, and is formed as a carabiner on said first side of said ellipse so that said carabiner can be readily disengaged to capture a rope surrounding a substantial object.

11. A lightweight high strength hook as recited by claim 9, wherein said second portion is a carabiner that can be readily disengaged to attach to other fire fighter tools.

12. A lightweight high strength hook as recited by claim 9, wherein said hook is composed of a high strength iron.

13. A lightweight high strength hook as recited by claim 9, wherein said hook is composed of a high strength titanium alloy.

14. A lightweight high strength hook as recited by claim 9, wherein said first portion and said second portion are arranged in a substantially parallel alignment with one another.

15. A lightweight high strength hook as recited by claim 9, wherein said central aperture has a height of at least about 3⅓ inches and a width of at least about 1 to 3 inches appointed for receiving a hand into said central aperture for optimal force when engaging said hook.

* * * * *